March 27, 1973   TAKESHI MASUYAMA ET AL   3,723,175
NONLINEAR RESISTORS OF BULK TYPE
Original Filed Sept. 27, 1968
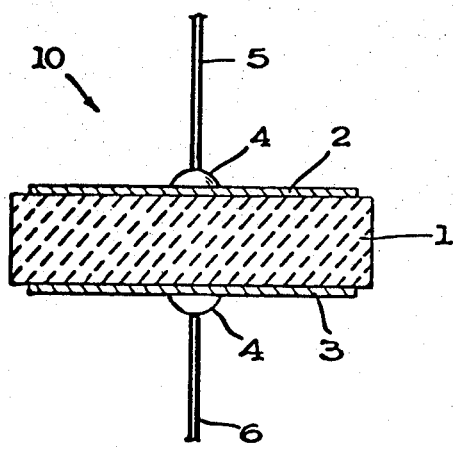
TAKESHI MASUYAMA,
MICHIO MATSUOKA and
TSUYOSHI NISHI, Inventors
By, *Wenderoth Lind ePouack*
Attorneys

United States Patent Office 3,723,175
Patented Mar. 27, 1973

3,723,175
NONLINEAR RESISTORS OF BULK TYPE
Takeshi Masuyama, Takatsuki-shi, Michio Matsuoka, Hirakata-shi, and Tsuyoshi Nishi, Osaka-shi, Japan, assignors to Matsushita Electric Industrial Co., Ltd., Osaka, Japan
Original application Sept. 27, 1968, Ser. No. 763,285, now Patent No. 3,663,458. Divided and this application June 11, 1970, Ser. No. 57,875
Int. Cl. B44d 1/02; C23c 3/00, 3/04
U.S. Cl. 117—201                              6 Claims

ABSTRACT OF THE DISCLOSURE

Improved nonlinear resistors of high $n$-value, wherein the nonlinearity is due to the bulk thereof and comprising a sintered body of zinc oxide with 0.1 to 1.0 mole percent bismuth oxide on a sintered body of zinc oxide at a temperature of 600° C. to 1200° C. for a time sufficient to diffuse bismuth ions into the bulk of the sintered body and heating the coated body.

---

The present application is a Rule 147 division of Ser. No. 763,285, filed Sept. 27, 1968, now U.S. Pat. No. 3,663,458.

This invention relates to nonlinear resistors having non-ohmic resistance due to the bulk thereof and more particularly to varistors comprising zinc oxide and bismuth oxide.

Various nonlinear resistors such as silicon carbide varistors, selenium rectifiers and germanium or silicon p-n junction diodes have been widely used for stabilization of voltage or current of electrical circuits. The electrical characteristics of such a nonlinear resistor are expressed by the relation:

$$I = (V/D)^n$$

where V is the voltage across the resistor, I is the current flowing through the resistor, C is a constant corresponding to the voltage at a given current and exponent $n$ is a numerical value greater than 1. The value of $n$ is calculated by the following equation:

$$n = \frac{\log_{10}(I_2/I_1)}{\log_{10}(V_2/V_1)}$$

where $V_1$ and $V_2$ are the voltages at given currents $I_1$ and $I_2$, respectively. The desired value of C depends upon the kind of application to which the resistor is to be put. It is ordinarily desirable that the value of $n$ be as large as possible since this exponent determinines the extent to which the resistors depart from ohmic characteristics.

Nonlinear resistors comprising sintered bodies of zinc oxide with or without additives and silver paint electrodes applied thereto, have previously been disclosed. The nonlinearity of such varistors is attributed to the interface between the sintered body of zinc oxide with or without additives and the silver paint electrode and is controlled mainly by changing the compositions of said sintered body and silver paint electrode. Therefore, it is not easy to control the C-value over a wide range after the sintered body is prepared. Similarly, in varistors comprising germanium or silicon p-n junction diodes, it is difficult to control the C-value over a wide range because the non-linearity of these varistors is not attributed to the bulk but to the p-n junction. On the other hand, the silicon carbide varistors have non-linearity due to the contacts among the individual grains of silicon carbide bonded together by a ceramic binding material, i.e. to the bulk, and the C-value is controlled by changing a dimension in the direction in which the current flows through the varistors. The silicon carbide varistors, however, have a relatively low $n$-value ranging from 3 to 6 and are prepared by firing in nonoxidizing atmosphere, especially for the purpose of obtaining a lower C-value.

An object of the present invention is to provide a nonlinear resistor having nonlinearity due to the bulk thereof and being characterized by a high $n$-value.

Another object of the present invention is to provide a method for making a nonlinear resistor having the nonlinearity due to the bulk thereof and being characterized by a high $n$-value, without using nonoxidizing atmosphere.

These and other objects of the invention will become apparent upon consideration of the following description taken together with the accompanying drawing in which the single figure is a partly cross-sectional view through a non-linear resistor in accordance with the invention.

Before proceeding with a detailed description of the non-linear resistors contemplated by the invention, their construction will be described with reference to the aforesaid figure of drawing wherein reference character 10 designates, as a whole, a nonlinear resistor comprising, as its active element, a sintered body having a pair of electrodes 2 and 3 in an ohmic contact applied to opposite surfaces thereof. Said sintered body 1 is prepared in a manner hereinafter set forth and is in any form such as circular, square or rectangular plate form. Wire leads 5 and 6 are attached conductively to the electrodes 2 and 3, respectively, by a connection means 4 such as solder or the like.

A nonlinear resistor according to the invention comprises a sintered body of a composition comprising zinc oxide and 0.05 to 10.0 mole percent of bismuth oxide, and ohmic electrodes applied to opposite surfaces of said sintered body. Such a nonlinear resistor has non-ohmic resistance due to the bulk itself. Therefore, its C-value can be changed without impairing the $n$-value by changing the distance between said opposite surfaces. The shorter distance results in the lower C-value.

The higher $n$-value can be obtained when said sintered body comprises 99.9 to 99.0 mole percent of zinc oxide and 0.1 to 1.0 mole percent of bismuth oxide in accordance with the invention.

Said ohmic electrodes can be made of an electroless plated or electrolytic plated film of Ag, Cu, Ni or Sn, a vacuum evaporated film of Al, Zn, Sn or In or a metallized film of Cu, Sn, Zn or Al in accordance with the prior well known technique.

According to the present invention, the $n$-value is elevated when said sintered body consists essentially of 80.0 to 99.9 mole percent of zinc oxide, 0.05 to 10.0 mole percent of bismuth oxide and 0.05 to 10.0 mole percent, in total, of at least one member selected from the group consisting of cobalt oxide, manganese oxide, indium oxide, antimony oxide, titanium oxide, boron oxide, aluminum oxide, tin oxide, barium oxide, nickel oxide, molybdenum oxide, tantalum oxide, iron oxide, and chromium oxide. Superior results are obtained with compositions having 94.0 to 99.8 mole percent of zinc oxide, 0.1 to 1.0 mole percent of bismuth oxide and 0.1 to 5.0 mole percent, in total, of at least one member selected from the group consisting of cobalt oxide, manganese oxide, indium oxide, antimony oxide, titanium oxide, boron oxide, aluminum oxide, tin oxide, barium oxide, nickel oxide, molybdenum oxide, tantalum oxide, iron oxide and chromium oxide.

According to the present invention, the resistor has an extremely high $n$-value when the sintered body consists essentially of 85.00 to 99.85 mole percent of zinc oxide, 0.05 to 5.0 mole percent of bismuth oxide, 0.05 to 5.0 mole percent of cobalt oxide or manganese oxide and 0.05 to 10.0 mole percent of, in total, at least one member selected from the group consisting of boron oxide, barium oxide, indium oxide, antimony oxide, titanium oxide and chormium oxide.

The optimum results are obtained with a sintered body consisting essentially of 84.00 to 99.80 mole percent of zinc oxide, 0.05 to 5.00 mole percent of bismuth oxide, 0.05 to 3.00 mole percent of cobalt oxide, 0.05 to 3.00 mole percent of manganese oxide and 0.05 to 5.00 mole percent of, in total, at least one member selected from the group consisting of boron oxide, barium oxide, indium oxide, antimony oxide, titanium oxide and chromium oxide.

The sintered body 1 can be prepared by a per se well known ceramic technique. The starting materials in the compositions described in the foregoing description are mixed in a wet mill so as to produce homogeneous mixtures. The mixtures are dried and pressed in a mold into desired shapes at a pressure from 100 kg./cm.$^2$ to 1000 kg./cm.$^2$. The pressed bodies are sintered in air at a given temperature for 1 to 3 hours, and then furnace-cooled to room temperature (about 15 to about 30° C.).

The sintering temperature is determined from the view of electrical resistivity, nonlinearity and stability. The zinc oxide sintered body having a single addition of bismuth oxide is advantageously fired at a temperature of 800 to 1200° C. The body sintered at a temperature higher than 1200° C. shows electrical resistivity and poor nonlinearity. With respect to the aforesaid sintered body of zinc oxide having a combined addition of bismuth oxide and at least one metal oxide selected from the group consisting of cobalt oxide, manganese oxide, indium oxide, antimony oxide, titanium oxide, boron oxide, aluminum oxide, tin oxide, barium oxide, nickel oxide, molybdenum oxide, tantalum oxide, iron oxide and chromium oxide, the advantageous firing temperature ranges from 1000 to 1450° C.

The pressed bodies are preferably sintered in nonoxidizing atmosphere such as nitrogen and argon when it is desired to reduce the electrical resistivity. The electrical resistivity also can be reduced by air-quenching from the sintering temperature to room temperature even when the pressed bodies are fired in air.

The mixtures can be preliminarily calcined at 700 to 1000° C. and pulverized for easy fabrication in the subsequent pressing step. The mixture to be pressed can be admixed with a suitable binder such as water, polyvinyl alcohol, etc.

It is advantageous that the sintered body be lapped at the opposited surfaces by abrasive powder such as silicon carbide in a particle size of 300 meshes to 1500 meshes.

The sintered bodies are provided, at the opposite surfaces thereof, with aforesaid ohmic electrodes in any available and suitable method.

Lead wires can be attached to the silver electrodes in a per se conventional manner by using conventional solder having a low melting point. It is convenient to employ a conductive adhesive comprising silver powder and resin in an organic solvent in order to connect the lead wires to the silver electrodes.

Nonlinear resistors according to this invention have a high stability to temperature and in the load life test, which is carried out at 70° C. at a rating power for 500 hours. The $n$-value and C-value do not change remarkably after heating cycles and load life test. It is advantageous for achievement of a high stability to humidity that the resultant non-linear resistors are embedded in a humidity proof resin such as epoxy resin and phenol resin in a per se well known manner.

A more preferable method for making a nonlinear resistor contemplated by the invention comprises providing a sintered body of zinc oxide with or without 0.1 to 5.0 mole percent in total, of at least one member selected from the group consisting of cobalt oxide, manganese oxide, indium oxide, antimony oxide, titanium oxide, boron oxide, aluminum oxide, tin oxide, barium oxide, nickel oxide, molybdenum oxide, tantalum oxide, iron oxide and chromium oxide; coating the opposite surfaces of said sintered body with a paste including, as a solid ingredient, bismuth oxide powder; firing the coated body at a temperature of 600 to 1200° C. in oxidizing atmosphere so as to diffuse bismuth ions into the bulk of said sintered body; cooling the bismuth diffused sintered body to room temperature; and applying aforesaid ohmic electrodes to opposite surfaces of the resultant body. Said sintered body can be prepared in a per se well known ceramic technique, i.e. by heating a pressed body in a given composition at a temperature of 1000 to 1450° C. for 1 hour in air or nonoxidizing atmosphere such as nitrogen gas or argon gas.

Said paste comprises, as a solid ingredient, bismuth oxide powder and an organic resin such as epoxy, vinyl or phenol resin in an organic solvent sch as butyl acetate, toluene or the like. Said bismuth oxide can be replaced with any bismuth compound such as bismuth carbonate or bismuth hydroxide which is converted into bismuth oxide when heated at 600 to 1200° C. Operable weight proportion of said bismuth oxide to organic solution is 20 to 80 wt. percent of bismuth oxide and the remainder of organic solution. According to the present invention, the $n$-value is extremely elevated when bismuth oxide as a solid ingredient in the paste is incorporated with cobalt oxide and/or manganese oxide. Operable and advantageous weight proportions of said solid ingredients are shown in Table 1.

TABLE 1

| | Bismuth oxide | Weight part cobalt oxide | Manganese oxide |
|---|---|---|---|
| Operable proportion | 2–8 | 2–8 | |
| | 2–8 | | 2–8 |
| | 2–8 | | |
| Superior proportion | 2–8 | 1–2 | 1–2 |

The cobalt oxide and manganese oxide can be in the form of metallic cobalt and metallic manganese, respectively, or in other compound form which upon being fired will be converted to oxide at the temperature employed. Most advantageous solid ingredient is finely divided glass frit comprising bismuth oxide, cobalt oxide and/or manganese oxide. Operable and preferable weight percentages of said glass frit are shown in Table 2.

TABLE 2

| | $Bi_2O_3$ | $B_2O_3$ | $SiO_2$ | CoO | MnO |
|---|---|---|---|---|---|
| Operable weight, percent | 50–84 | 8–25 | 8–25 | | |
| | 48–80 | 8–23 | 8–23 | 4–16 | |
| | 48–80 | 8–23 | 8–23 | | 4–16 |
| Superior weight, percent | 40–70 | 10–20 | 10–20 | 5–10 | 5–10 |

Said glass frit in a powder form is dispersed in an organic solvent such as butyl acetate, toluene or the like dissolving organic resin such as epoxy, vinyl and phenol resin. Care should be taken that said glas frit does not include alkali metal ions in a monovalence such as lithium ions, potassium ions or sodium ions. Operable weight percent desirable paste is 20 to 60 weight percent of glass frit in a powder form, 20 to 40 weight percent of said organic resin and 20 to 40 weight percent of said organic solvent.

The diffusion temperature and time depend on the weight percent of bismuth oxide in said paste and should be controlled so that the diffused bismuth oxide distributes uniformly throughout the sintered body of zinc oxide and is in an amount of 0.1 to 1.0 mole percent. The higher diffusion temperature requires the shorter diffusion time.

Such a diffusion technique produces a sintered body having a $n$-value higher than that of a sintered body prepared by sintering a mixture of 99.9 to 99.0 mole percent of zinc oxide and 0.1 to 1.0 mole percent of bismuth oxide or a 99.8 to 94.0 mole percent of zinc oxide, 0.1 to 1.0 mole percent of bismuth oxide, and 0.1 to 5.0 mole percent of at least one member selected from the group consisting of cobalt oxide, manganese oxide, indium oxide, antimony oxide, titanium oxide, boron oxide, aluminum oxide, tin oxide, barium oxide, nickel oxide, molybdenum oxide, tantalum oxide, iron oxide and chromium oxide.

Presently preferred illustrative embodiments of the invention are as follows:

EXAMPLE 1

Starting materials listed in Table 3 are mixed in a wet mill for 5 hours.

The mixture is dried and pressed in a mold into a disc of 13 mm. in diameter and 2.5 mm. in thickness at a pressure of 340 kg./cm.$^2$.

The pressed body is sintered in air for 1 hour at the temperature listed in Table 3, and then furnace-cooled to room temperature (about 15° to about 30° C.). The sintered disc is lapped to the thickness listed in Table 3 at the opposite surfaces thereof by silicon carbide abrasive in a particle size of 600 meshes. The opposite surfaces of the sintered disc are provided with a spray metallized film of aluminum in a per se well known technique. Lead wires are attached to the aluminum electrodes by means of conductive silver paint. The electric characteristics of the resultant resistor are shown in Table 3. It will be readily understood that the C-value changes in proportion to the thickness of the sintered body. The best sintering temperature for the zinc oxide sintered body incorporated with bismuth oxide ranges from 800° to 1200° C.

TABLE 3

| Starting materials (mole percent) | | Sintering temperature (° C.) | Thickness (mm.) | Electric characteristics of resultant resistors | |
|---|---|---|---|---|---|
| ZnO | $Bi_2O_3$ | | | C (at a given current of 1 ma.) | n |
| 99.8 | 0.2 | 750 | 1.0 | 200 | 1.8 |
| 99.8 | 0.2 | 800 | 1.0 | 81 | 3.2 |
| 99.8 | 0.2 | 1,000 | 1.0 | 43 | 4.3 |
| 99.8 | 0.2 | 1,150 | 1.0 | 44 | 4.2 |
| 99.8 | 0.2 | 1,300 | 1.0 | 0.3 | 1.1 |
| 99.8 | 0.2 | 1,000 | 2.0 | 84 | 4.3 |
| 99.8 | 0.2 | 1,000 | 1.5 | 65 | 4.3 |
| 99.8 | 0.2 | 1,000 | 0.8 | 43 | 4.4 |
| 99.8 | 0.2 | 1,000 | 0.5 | 21 | 4.5 |
| 99.95 | 0.05 | 1,100 | 1.0 | 30 | 3.0 |
| 99.9 | 0.1 | 1,100 | 1.0 | 40 | 4.0 |
| 99.5 | 0.5 | 1,100 | 1.0 | 53 | 4.8 |
| 99.0 | 1.0 | 1,100 | 1.0 | 56 | 4.0 |
| 95.0 | 5.0 | 1,100 | 1.0 | 65 | 3.3 |

EXAMPLE 2

Starting materials according to Table 4 are mixed and pressed in the same manner as that described in Example 1.

The pressed body is sintered in air at 1350° C. for 1 hour then furnace-cooled to room temperature (about 15° to about 30° C.). The sintered disc is lapped at the opposite surfaces thereof by silicon carbide abrasive in a particle size of 600 meshes. Resulting sintered disc has a size of 10 mm. in diameter and 1.5 mm. in thickness. The opposite surfaces of the sintered disc are provided with a spray metallized film of aluminum in a per se well known technique. Lead wires are attached to the aluminum electrodes by means of conductive silver paint. The electric characteristics of the resultant resistor are shown in Table 4. It will be readily understood that the n-value can be remarkably elevated by a further addition of one member selected from the group consisting of cobalt oxide, manganese oxide, indium oxide, antimony oxide, tin oxide, barium oxide, nickel oxide and chromium oixde; the C-value at a given current of 1 ma. can be lowered remarkably by a further addition of one member selected from the group consisting of titanium oxide, boron oxide, aluminum oxide, molybdenum oxide, tantalum oxide and iron oxide.

TABLE 4

| Starting materials (mole percent) | | | | Electric characteristics of resultant resistors | |
|---|---|---|---|---|---|
| ZnO | $Bi_2O_3$ | Further additives | | C (at a given current of 1 ma.) | n |
| 99.9 | 0.05 | CoO | 0.05 | 34 | 5.4 |
| 99.4 | 0.1 | CoO | 0.5 | 48 | 10.2 |
| 99.0 | 0.5 | CoO | 0.5 | 62 | 15.6 |
| 98.5 | 1.0 | CoO | 0.5 | 73 | 12.3 |
| 89.5 | 10.0 | CoO | 0.5 | 97 | 8.6 |
| 90.0 | 5.0 | CoO | 5.0 | 105 | 5.6 |
| 99.0 | 0.5 | $MnO_2$ | 0.5 | 84 | 14.5 |
| 99.0 | 0.5 | $In_2O_3$ | 0.5 | 250 | 10.3 |
| 98.5 | 0.5 | $Sb_2O_3$ | 1.0 | 75 | 15.3 |
| 99.0 | 0.5 | $SnO_2$ | 0.5 | 214 | 10.7 |
| 99.0 | 0.5 | BaO | 0.5 | 76 | 12.8 |
| 99.0 | 0.5 | NiO | 0.5 | 49 | 8.2 |
| 99.0 | 0.5 | $Cr_2O_3$ | 0.5 | 178 | 14.6 |
| 99.47 | 0.5 | $MnO_2$ | 0.03 | 16 | 2.4 |
| 99.45 | 0.5 | $MnO_2$ | 0.05 | 130 | 7.5 |
| 99.3 | 0.5 | $MnO_2$ | 0.2 | 90 | 11.5 |
| 97.0 | 0.5 | $MnO_2$ | 2.5 | 140 | 4.3 |
| 87.5 | 0.5 | $MnO_2$ | 12.0 | 200 | 2.1 |
| 99.0 | 0.5 | $TiO_2$ | 0.5 | 8.2 | 6.4 |
| 99.0 | 0.5 | $B_2O_3$ | 0.5 | 6.5 | 5.7 |
| 99.0 | 0.5 | $Al_2O_3$ | 0.5 | 3.6 | 4.6 |
| 99.0 | 0.5 | $MoO_3$ | 0.5 | 11.2 | 6.8 |
| 99.0 | 0.5 | $Ta_2O_5$ | 0.5 | 9.8 | 6.5 |
| 99.0 | 0.5 | $Fe_2O_3$ | 0.5 | 5.3 | 4.9 |

EXAMPLE 3

Starting materials according to Table 5 are pressed, fired, lapped and electrodes attached in the same manner as that described in Example 2. The electric characteristics of the resultant resistors are shown in Table 5. It can be easily understood that when the zinc oxide sintered body including bismuth oxide further includes at least two members selected from the group consisting of cobalt oxide, manganese oxide, boron oxide, barium oxide, indium oxide, antimony oxide, titanium oxide and chromium oxide, the resultant sintered body has excellent nonlinear properties. Thus, a sintered body including titanium oxide exhibits relatively low C at a given current of ma. and an excellent high $n$.

TABLE 5

| Starting materials (mole percent) | | | | | | Electric characteristics of resultant resistors | |
|---|---|---|---|---|---|---|---|
| ZnO | $Bi_2O_3$ | CoO | $MnO_2$ | Further additives | | C (at a given current of 1 ma.) | n |
| 98.95 | 0.5 | 0.5 | 0.05 | | | 63 | 12.8 |
| 98.5 | 0.5 | 0.5 | 0.5 | | | 87 | 14.3 |
| 94.0 | 0.5 | 0.5 | 5.0 | | | 109 | 13.8 |
| 98.95 | 0.5 | 0.05 | 0.5 | | | 82 | 13.1 |
| 98.0 | 0.5 | 1.0 | 0.5 | | | 93 | 15.3 |
| 94.0 | 0.5 | 5.0 | 0.5 | | | 118 | 14.5 |
| 98.5 | 0.5 | 0.5 | | $B_2O_3$ | 0.5 | 88 | 21.3 |
| 98.5 | 0.5 | 0.5 | | BaO | 0.5 | 52 | 22.3 |
| 98.5 | 0.5 | 0.5 | | $In_2O_3$ | 0.5 | 318 | 16.2 |
| 98.5 | 0.5 | 0.5 | | $Sb_2O_3$ | 0.5 | 160 | 25.3 |
| 98.5 | 0.5 | 0.5 | | $TiO_2$ | 0.5 | 31 | 9.0 |
| 98.5 | 0.5 | 0.5 | | $Cr_2O_3$ | 0.5 | 252 | 19.3 |
| 98.5 | 0.5 | | 0.5 | $B_2O_3$ | 0.5 | 101 | 22.2 |
| 98.5 | 0.5 | | 0.5 | BaO | 0.5 | 73 | 21.5 |
| 98.5 | 0.5 | | 0.5 | $In_2O_3$ | 0.5 | 385 | 17.8 |
| 98.5 | 0.5 | | 0.5 | $Sb_2O_3$ | 0.5 | 150 | 27.4 |
| 98.5 | 0.5 | | 0.5 | $TiO_2$ | 0.5 | 58 | 12.1 |
| 98.5 | 0.5 | | 0.5 | $Cr_2O_3$ | 0.5 | 303 | 20.0 |
| 98.0 | 0.5 | 0.5 | 0.5 | $B_2O_3$ | 0.5 | 78 | 25.4 |
| 98.0 | 0.5 | 0.5 | 0.5 | BaO | 0.5 | 50 | 26.8 |
| 98.0 | 0.5 | 0.5 | 0.5 | $In_2O_3$ | 0.5 | 294 | 21.4 |
| 97.5 | 0.5 | 0.5 | 0.5 | $Sb_2O_3$ | 1.0 | 110 | 33.5 |
| 98.0 | 0.5 | 0.5 | 0.5 | $TiO_2$ | 0.5 | 31.5 | 14.0 |
| 98.0 | 0.5 | 0.5 | 0.5 | $Cr_2O_3$ | 0.5 | 228 | 23.4 |

EXAMPLE 4

A sintered body of pure zinc oxide is prepared by pressing zinc oxide powder at 340 kg./cm.$^2$ and heating the pressed body for 1 hour at a temperature listed in Table 6. After being cooled to room temperature, the sintered body is lapped at both opposite surfaces with silicon carbide abrasive. The lapped surfaces are coated with a paste containing 50 wt. percent of bismuth oxide in an epoxy resin butyl alcohol solution. The applied paste is fired at the temperature listed in Table 6 for 30 minutes in air. A chemical analysis of the fired body indicates that bismuth oxide diffuses into the sintered body of zinc oxide. Then Al electrodes and lead wires are attached to the opposite surfaces of the sintered disc in the same manner as that described in Example 1. The electric characteristics of the resultant resistor are shown in Table 6. It will be readily understood from comparison between Table 3 and 6 that the $n$-value of the resistor can be elevated greatly by firing-on paste containing bismuth oxide.

TABLE 6

| Heating temperature (° C.) | | Electric characteristics of resultant resistors | |
|---|---|---|---|
| Pressed body | Paste | C (at a given current of 1 ma.) | $n$ |
| 800 | 800 | 300 | 6.8 |
| 1,000 | 800 | 230 | 8.3 |
| 1,150 | 800 | 170 | 7.8 |
| 1,300 | 800 | 100 | 7.5 |
| 1,400 | 800 | 85 | 7.2 |
| 1,350 | 600 | 13 | 4.2 |
| 1,350 | 800 | 90 | 7.3 |
| 1,350 | 1,000 | 130 | 7.2 |
| 1,350 | 1,200 | 80 | 5.1 |
| 1,350 | 1,300 | 24 | 2.6 |

EXAMPLE 5

A mixture of a composition listed in Table 7 is pressed, fired in the same manner as that described in Example 2. The sintered body is lapped at opposite surfaces and is covered at the opposite surfaces with paste according to Example 4. The paste applied to the opposite surfaces is fired at 800° C. for 30 minutes in air. Then Al electrodes and lead wires are attached to the opposite surfaces in the same manner as that set forth in Example 1. The electric characteristics of the resultant resistor are shown in Table 7. It will be readily understood from a comparison between Table 4 and 7 that the $n$-value of the resistor can be elevated greatly by using paste containing bismuth oxide.

TABLE 7

| Starting material (mol percent) | | Electric characteristics of resultant resistors | |
|---|---|---|---|
| Zno | Additives | C (at a given current of 1 ma.) | $n$ |
| 99.5 | $In_2O_3$ 0.5 | 220 | 15.3 |
| 99.5 | $Sb_2O_3$ 0.5 | 130 | 19.7 |
| 99.5 | $SnO_2$ 0.5 | 284 | 18.5 |
| 99.5 | BaO 0.5 | 105 | 20.2 |
| 99.5 | NiO 0.5 | 80 | 12.5 |
| 99.5 | $TiO_2$ 0.5 | 15 | 9.3 |
| 99.5 | $B_2O_3$ 0.5 | 12 | 8.5 |
| 99.5 | $Al_2O_3$ 0.5 | 6.3 | 8.2 |
| 99.5 | $MoO_3$ 0.5 | 15 | 9.8 |
| 99.5 | $Ta_2O_5$ 0.5 | 14 | 9.2 |
| 99.5 | $Fe_2O_3$ 0.5 | 7.6 | 8.8 |
| 99.5 | $Cr_2O_3$ 0.5 | 163 | 19.8 |
| 99.9 | $Al_2O_3$ 0.1 | 112 | 10.3 |
| 99.8 | $Al_2O_3$ 0.2 | 46 | 5.6 |
| 99.0 | $Al_2O_3$ 1.0 | 6.2 | 7.4 |
| 99.95 | CoO 0.05 | 51 | 7.2 |
| 99.5 | CoO 0.5 | 83 | 17.4 |
| 95.0 | CoO 5.0 | 130 | 9.2 |
| 99.95 | $MnO_2$ 0.05 | 96 | 8.4 |
| 99.8 | $MnO_2$ 0.2 | 114 | 15.3 |
| 97.5 | $MnO_2$ 2.5 | 177 | 6.8 |
| 88.0 | $MnO_2$ 12.0 | 450 | 2.6 |

EXAMPLE 6

A mixture of a composition listed in Table 8 is pressed in the same manner as that set forth in Example 1. The pressed body is sintered in air at the temperature listed in Table 8 for 1 hour and then furnace-cooled to room temperature. The sintered disc is completed to the non-ohmic resistor in the same manner as that described in Example 5. The electric characteristics of the resultant resistor are shown in Table 8. It will be readily understood that the $n$-value of the resistor can be elevated greatly by using paste containing bismuth oxide as seen from a comparison between Table 5 and 8.

TABLE 8

| Starting materials (mole percent) | | | | | Sintering temperature (° C.) | Electric characteristics of resultant resistors | |
|---|---|---|---|---|---|---|---|
| ZnO | CoO | $MnO_2$ | Further additives | | | C (at a given current of 1 ma.) | $n$ |
| 99.45 | 0.5 | 0.05 | | | 1,350 | 87 | 15.4 |
| 99.0 | 0.5 | 0.5 | | | 1,350 | 104 | 17.6 |
| 94.5 | 0.5 | 5.0 | | | 1,350 | 132 | 18.3 |
| 99.45 | 0.05 | 0.5 | | | 1,350 | 101 | 17.9 |
| 98.5 | 1.0 | 0.5 | | | 1,350 | 125 | 19.0 |
| 94.5 | 5.0 | 0.5 | | | 1,350 | 146 | 18.1 |
| 99.0 | 0.5 | | $B_2O_3$ | 0.5 | 1,350 | 92 | 25.6 |
| 99.0 | 0.5 | | BaO | 0.5 | 1,350 | 81 | 27.2 |
| 99.0 | 0.5 | | $In_2O_3$ | 0.5 | 1,350 | 283 | 19.5 |
| 99.0 | 0.5 | | $Sb_2O_3$ | 0.5 | 1,350 | 216 | 29.4 |
| 99.0 | 0.5 | | $TiO_2$ | 0.5 | 1,350 | 66 | 13.7 |
| 99.0 | 0.5 | | $Cr_2O_3$ | 0.5 | 1,350 | 235 | 22.8 |
| 99.0 | | 0.5 | $B_2O_3$ | 0.5 | 1,350 | 130 | 29.5 |
| 99.0 | | 0.5 | BaO | 0.5 | 1,350 | 94 | 22.3 |
| 99.0 | | 0.5 | $In_2O_3$ | 0.5 | 1,350 | 340 | 22.7 |
| 99.0 | | 0.5 | $Sb_2O_3$ | 0.5 | 1,350 | 190 | 24.5 |
| 99.0 | | 0.5 | $TiO_2$ | 0.5 | 1,350 | 66 | 13.6 |
| 99.0 | | 0.5 | $Cr_2O_3$ | 0.5 | 1,350 | 282 | 25.6 |
| 98.5 | 0.5 | 0.5 | $B_2O_3$ | 0.5 | 1,350 | 89 | 31.5 |
| 98.5 | 0.5 | 0.5 | BaO | 0.5 | 1,350 | 60 | 32.4 |
| 98.5 | 0.5 | 0.5 | $In_2O_3$ | 0.5 | 1,350 | 243 | 25.5 |
| 98.5 | 0.5 | 0.5 | $Sb_2O_3$ | 0.5 | 1,350 | 120 | 39.2 |
| 98.5 | 0.5 | 0.5 | $Al_2O_3$ | 0.5 | 1,350 | 22 | 12.3 |
| 98.5 | 0.5 | 0.5 | $TiO_2$ | 0.5 | 1,350 | 37 | 13.0 |
| 98.5 | 0.5 | 0.5 | $TiO_2$ | 0.5 | 1,000 | 74 | 14.7 |
| 98.5 | 0.5 | 0.5 | $TiO_2$ | 0.5 | 1,100 | 57 | 13.6 |
| 98.5 | 0.5 | 0.5 | $TiO_2$ | 0.5 | 1,200 | 43 | 12.3 |
| 98.5 | 0.5 | 0.5 | $Cr_2O_3$ | 0.5 | 1,350 | 223 | 27.8 |

EXAMPLE 7

A mixture of a composition of Table 9 is pressed and fired in the same manner as that set forth in Example 2. The sintered body is lapped at the opposite surfaces and covered at the opposite surfaces with a paste containing solid ingredients as listed in Table 9. The paste applied to the opposite surfaces is fired in air at 800° C. for 30 minutes. Then Al electrodes and lead wires are attached to the opposite surfaces in the same manner as that described in Example 1. The electric characteristics of the resultant resistor are shown in Table 9.

TABLE 9

| Starting materials (mole percent) | | Weight percent of solid ingredients (percent) | | | Electric characteristics of resultant resistors | |
|---|---|---|---|---|---|---|
| ZnO | Additives | $Bi_2O_3$ | CoO | $MnO_2$ | C (at a given current of 1 ma.) | $n$ |
| 99.5 | $MnO_2$ 0.5 | 70 | 30 | | 40 | 19.5 |
| 99.5 | $B_2O_3$ 0.5 | 70 | 30 | | 60 | 34.2 |
| 99.5 | BaO 0.5 | 70 | 30 | | 72 | 43.4 |
| 99.5 | $In_2O_3$ 0.5 | 70 | 30 | | 215 | 27.3 |
| 99.5 | $Sb_2O_3$ 0.5 | 70 | 30 | | 130 | 42.1 |
| 99.5 | $TiO_2$ 0.5 | 70 | 30 | | 24 | 16.8 |
| 99.5 | $Cr_2O_3$ 0.5 | 70 | 30 | | 158 | 32.1 |
| 99.5 | CoO 0.5 | 70 | | 30 | 70 | 24.3 |
| 99.5 | $B_2O_3$ 0.5 | 70 | | 30 | 64 | 37.5 |
| 99.5 | BaO 0.5 | 70 | | 30 | 77 | 43.1 |
| 99.5 | $In_2O_3$ 0.5 | 70 | | 30 | 220 | 24.3 |
| 99.5 | $Sb_2O_3$ 0.5 | 70 | | 30 | 140 | 40.8 |
| 99.5 | $TiO_2$ 0.5 | 70 | | 30 | 37 | 16.6 |
| 99.5 | $Cr_2O_3$ 0.5 | 70 | | 30 | 167 | 34.2 |
| 100 | | 70 | | 30 | 200 | 12.7 |
| 100 | | 70 | 30 | | 180 | 11.3 |
| 100 | | 50 | 25 | 25 | 150 | 13.4 |
| 99.5 | $B_2O_3$ | 50 | 25 | 25 | 58 | 38.1 |
| 99.5 | BaO | 50 | 25 | 25 | 67 | 43.3 |
| 99.5 | $In_2O_3$ | 50 | 25 | 25 | 200 | 32.2 |
| 99.5 | $Sb_2O_3$ | 50 | 25 | 25 | 110 | 45.8 |
| 99.5 | $TiO_2$ | 50 | 25 | 25 | 22 | 17.2 |
| 99.5 | $Cr_2O_3$ | 50 | 25 | 25 | 148 | 35.6 |

EXAMPLE 8

The resistors og Examples 2, 3, 5, 6 and 7 are tested in accordance with a method widely used in the electronic components parts. The load life test is carried out at 70° C. ambient temperature at 1 watt rating power for 500 hours. The heating cycle test is carried out by repeating 5 times the cycle in which said resistors are kept at 85° C. ambient temperature for 30 minutes, cooled rapidly to −20° C. and then kept at such temperature for 30 minutes. Table 10 shows the average change rates of C-value and n-value of resistors after heating cycles and load life test.

TABLE 10

| Sample number | Change rates after life test (percent) | | Change rates after heating cycle test (percent) | |
|---|---|---|---|---|
| | c | n | c | n |
| Example: | | | | |
| 2 | 10 | −10 | 7 | −5 |
| 3 | 8 | −12 | 7 | −6 |
| 5 | 7 | −4 | 3 | −2 |
| 6 | 4 | −6 | 3 | −2 |
| 7 | 4 | −6 | 3 | −2 |

EXAMPLE 9

A mixture of a composition of Table 12 is pressed in the same manner as that set forth in Example 2. The pressed body is sintered in air at 1350° C. for 1 hour and then furnace-cooled to room temperature. The sintered disc is lapped at the opposite surfaces and coated at the opposite surfaces with a paste having a composition set forth hereinbelow. The paste applied to opposite surfaces is fired at 800° C. for 30 minutes in air. The pastes have a solid ingredients composition shown in Table 11 and are prepared mixing 10 weight parts, in total, of said solid ingredients with 100 weight parts of epoxy resin in 20 to 40 weight parts of butyl alcohol. Then Al electrodes and lead wires are attached to the opposite surfaces in the same manner as that set forth in Example 1. The electric characteristics of the resultant resistor and the change rates after life test carried out in a way similar to that described in Example 8 are shown in Table 12.

TABLE 11

| | Weight percent | | | | |
|---|---|---|---|---|---|
| Number: | $Bi_2O_3$ | $B_2O_3$ | $SiO_2$ | CoO | $MnO_2$ |
| 1 | 75 | 13 | 12 | | |
| 2 | 70 | 11 | 11 | 8 | |
| 3 | 70 | 11 | 11 | | 8 |
| 4 | 62 | 11 | 11 | 8 | 8 |

TABLE 12

| Starting materials (mole percent) | | Coating materials number | Electric characteristics of resultant resistors | | Change rates after life test (percent) | |
|---|---|---|---|---|---|---|
| ZnO | Additives | | C (at a given current of 1 ma.) | n | C | n |
| 100 | | 1 | 200 | 4.0 | 2 | −4 |
| 100 | | 2 | 210 | 8.0 | 2 | −3 |
| 100 | | 3 | 250 | 9.5 | 3 | −3 |
| 100 | | 4 | 180 | 11.4 | 2 | −2 |
| 99.5 | CoO 0.5 | 1 | 60 | 15.3 | 1 | −3 |
| 99.5 | $MnO_2$ 0.5 | 1 | 103 | 23.2 | 2 | −3 |
| 99.5 | $In_2O_3$ 0.5 | 1 | 180 | 14.3 | 2 | −3 |
| 99.5 | $Sb_2O_3$ 0.5 | 1 | 90 | 22.6 | 1 | −4 |
| 99.5 | $TiO_2$ 0.5 | 1 | 13 | 13.5 | 1 | −2 |
| 99.5 | $B_2O_3$ 0.5 | 1 | 41 | 19.1 | 2 | −2 |
| 99.5 | $Al_2O_3$ 0.5 | 1 | 18 | 12.7 | 1 | −3 |
| 99.5 | $SnO_2$ 0.5 | 1 | 150 | 14.5 | 2 | −3 |
| 99.5 | BaO 0.5 | 1 | 92 | 21.4 | 2 | −3 |
| 99.5 | NiO 0.5 | 1 | 57 | 15.8 | 1 | −2 |
| 99.5 | $In_2O_3$ 0.5 | 2 | 143 | 29.5 | 2 | −2 |
| 99.5 | $In_2O_3$ 0.5 | 3 | 150 | 31.9 | 2 | −2 |
| 99.5 | $In_2O_3$ 0.5 | 4 | 130 | 33.4 | 1 | − |
| 99.5 | $Cr_2O_3$ 0.5 | 1 | 141 | 18.1 | 1 | −1 |

The embodiments of the invention in which an exclusive property or privilege is claimed are defined as follows:

1. In a method for making a nonlinear resistor comprising sintered body of zinc oxide incorporated with 0.1 to 1.0 mole percent of bismuth oxide and ohmic electrodes applied to opposite surfaces of said sintered body, the improvement which consists of providing a sintered body of zinc oxide, coating opposite surfaces of said sintered body with a paste comprising 20 to 80 weight percent of finely powdered bismuth oxide, heating the coated body at 600 to 1200° C. in an oxidizing atmosphere to diffuse bismuth ions into the bulk of said sintered body, and then cooling the sintered body to room temperature.

2. The improvement in making a nonlinear resistor defined by claim 1, wherein said sintered body of zinc oxide includes further 0.1 to 5.0 mole percent, in total, of at least one member selected from the group consisting of cobalt oxide, manganese oxide, indium oxide, antimony oxide, titanium oxide, boron oxide, aluminum oxide, tin oxide, barium oxide, nickel oxide, molybdenum oxide, tantalum oxide, iron oxide and chromium oxide.

3. The improvement in making a nonlinear resistor defined by claim 1, wherein said paste comprises, as a solid ingredient, powdered glass frit of a composition consisting essentially of 48 to 80 weight percent of bismuth oxide, 8 to 23 weight percent of boron oxide, 8 to 23 weight percent of silica, and 4 to 16 weight percent in total, of at least one member selected from the group consisting of cobalt oxide and manganese oxide.

4. In a method for making a nonlinear resistor comprising sintered body of zinc oxide incorporated with 0.1 to 1.0 mole percent of bismuth oxide and ohmic electrodes applied to opposite surfaces of said sintered body, the improvement which consists of providing a sintered body of zinc oxide, coating opposite surfaces of said sintered body with a paste comprising 20 to 80 weight percent of a finely powdered mixture of (a) bismuth and (b) a member selected from the group consisting of cobalt metal and cobalt compounds, said member being convertible to cobalt oxide when at the heating temperature defined below, the proportion of said cobalt oxide to bismuth oxide being 2 to 8 weight parts of cobalt oxide to 2 to 8 weight parts of bismuth oxide, heating the coated body in an oxidizing atmosphere at 600 to 1200° C. to diffuse bismuth and cobalt ions into the bulk of the sintered body and then cooling the sintered body to room temperature.

5. In a method for making a nonlinear resistor comprising sintered body of zinc oxide incorporated with 0.1 to 1.0 mole percent of bismuth oxide and ohmic electrodes applied to opposite surfaces of soid sintered body, the improvement which consists of providing a sintered body of zinc oxide, coating opposite surfaces of said sintered body with a paste comprising 20 to 80 weight percent of a finely powdered mixture of (a) bismuth and (b) a member selected from the group consisting of manganese metal and manganese compounds, said member being convertible to manganese oxide when at the heating temperature defined below, the proportion of said manganese oxide and bismuth oxide being 2 to 8 weight parts of manganese oxide to 2 to 8 weight parts of bismuth oxide, heating the coated body at 600 to 1200° C. in an oxidizing atmosphere to diffuse bismuth and manganese ions into the bulk of the sintered body and then cooling the sintered body to room temperature.

6. In a method for making a nonlinear resistor comprising sintered body of zinc oxide incorporated with 0.1 to 1.0 mole percent of bismuth oxide and ohmic electrodes applied to opposite surfaces of said sintered body, the improvement which consists of providing a sintered body of zinc oxide, coating opposite surfaces of said sintered body with a paste comprising 20 to 80 weight percent of a finely powdered mixture of (a) bismuth oxide, (b) a member selected from the group consisting of manganese metal and manganese compounds, said member being convertible to manganese oxide at the heating temperature defined below and (c) a member selected from the group consisting of cobalt metal and cobalt compounds, said member being convertible to cobalt oxide at the heating temperature defined below, the proportion of cobalt oxide to manganese oxide to bismuth oxide being 1 to 2 weight parts cobalt oxide to 1 to 2 weight parts manganese oxide to 2 to 8 weight parts bismuth oxide, heating the coating body at 600 to 1200° C. in an oxidizing atmosphere to diffuse bismuth, cobalt and manganese ions into the bulk of the sintered body and then cooling the sintered body to room temperature.

References Cited

UNITED STATES PATENTS

| | | | |
|---|---|---|---|
| 3,598,763 | 8/1971 | Matsuoka et al. | 252—518 |
| 3,503,029 | 3/1970 | Matsuoka | 252—518 X |
| 2,888,370 | 5/1959 | Damon et al. | 117—201 X |
| 2,717,946 | 9/1955 | Peck | 117—201 X |
| 2,060,393 | 11/1936 | Heyroth | 117—201 X |

ALFRED L. LEAVITT, Primary Examiner

K. P. GLYNN, Assistant Examiner

U.S. Cl. X.R.

29—620; 117—217, 227; 252—518